Aug. 9, 1949. J. C. KOONZ 2,478,536
COMMUTATOR CONSTRUCTION FOR ELECTRIC DEVICES
Filed Oct. 12, 1946 2 Sheets-Sheet 1
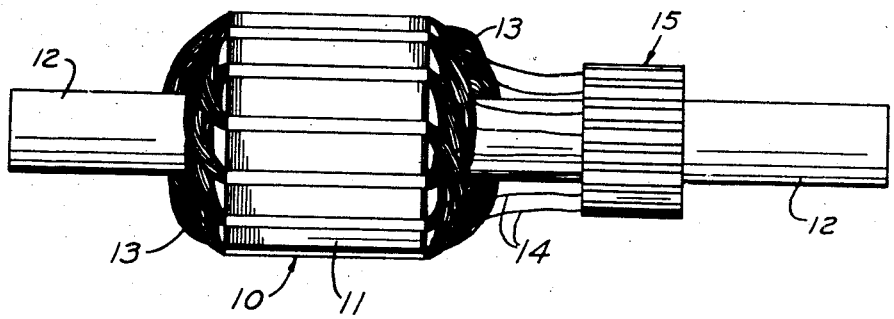
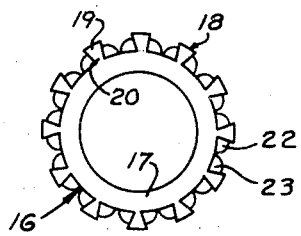
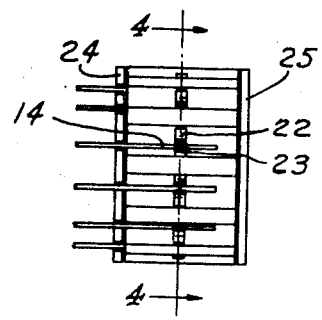
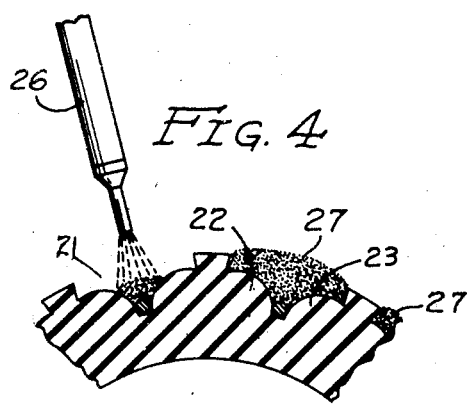
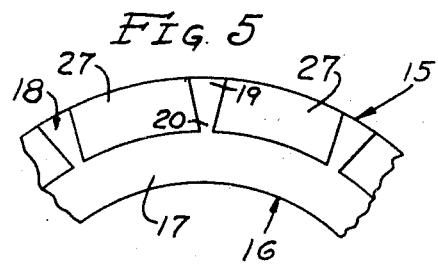
John C. Koonz
Inventor
By Kenneth T. Snow
Att'y.

Aug. 9, 1949.        J. C. KOONZ        2,478,536
COMMUTATOR CONSTRUCTION FOR ELECTRIC DEVICES
Filed Oct. 12, 1946                    2 Sheets-Sheet 2
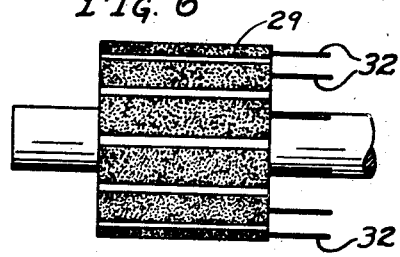
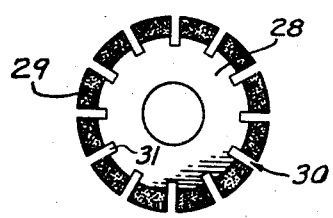
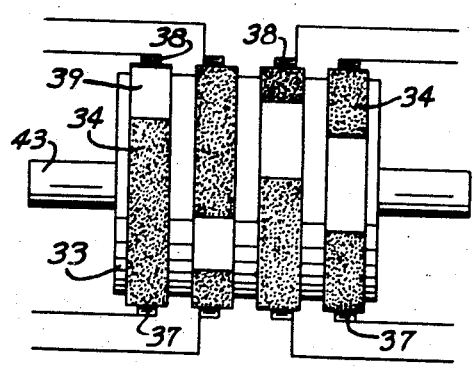
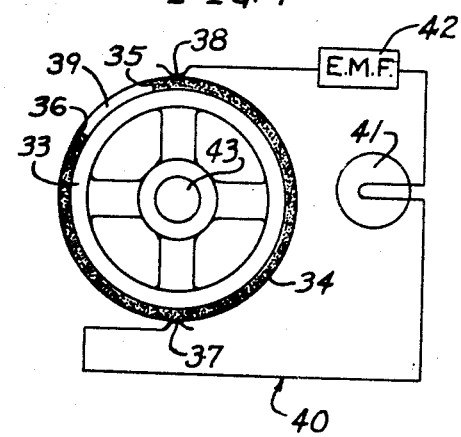
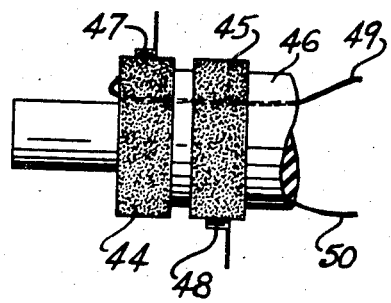
John C. Koonz
Inventor
By Kenneth T. Snow
Att'y.

UNITED STATES PATENT OFFICE 2,478,536

COMMUTATOR CONSTRUCTION FOR ELECTRIC DEVICES

John C. Koonz, Fort Wayne, Ind.

Application October 12, 1946, Serial No. 703,048

4 Claims. (Cl. 171—321)

This invention relates to a new and improved commutator construction for electrical devices in which the contact portions of the commutator are built up by deposits of fused metal applied in a manner generally known as a metallizing process.

An important object of this invention is to provide a means for attaching the lead wires of armature coils to a commutator associated with the armature.

Another object of this invention is the provision of means for constructing a commutator by providing an insulator having radially extending fingers and a means for gripping an armature coil lead wire in the spaces intermediate the fingers and depositing finely divided particles of fused metal with a metallizing gun on the gripped lead wire in quantities sufficient to fill the spaces between the insulating fingers.

A further object of this invention is to provide a method of making a contacting means for any type of electrical device.

Still further it is an object of this invention to metallize slip rings for motors or time interval electrical switches.

Commutators are at present made in several different ways. In each of these methods, however, it is necessary to individually attach the lead wires of the armature coils to individual segments of copper or other material used as contacts in the commutator. The preforming of the commutator copper segments is an exacting process inasmuch as the segments must form a relatively tight fit in a preformed insulating core. Further, after inserting the preformed copper segments it is then necessary to individually solder the armature coil lead wires to each of the segments around the annular commutator.

It is therefore an important object of this invention to provide a method of constructing a commutator which simultaneously attaches lead wires to the commutator segments as the segments are formed in position in a preformed insulating core.

A still further object of this invention is to provide a method of commutator construction in which the contact segments are formed in a preformed core and are locked in position on the core by reason of the particular design of the core spaces between the insulators.

Other and further important objects of this invention will become apparent from the disclosures in the following specification and accompanying drawings.

In the drawings:

Figure 1 is a front view of an electric motor armature incorporating the commutator construction of this invention.

Figure 2 is a front view detail of the commutator core as used in the device of Figure 1.

Figure 3 is a top plan view of the device as shown in Figure 2.

Figure 4 is a sectional view of a portion of the device taken on the line 4—4 of Figure 3 showing the building up of the commutator segments by metallizing.

Figure 5 is a side view of a portion of the finished commutator showing the annular periphery cut to form a smooth surface.

Figure 6 is a side elevational view showing a modified commutator of this invention.

Figure 7 is an end view of the device shown in Figure 6.

Figure 8 is a side elevational view of a rotatable cylinder having a plurality of adjacent time interval electrical switches.

Figure 9 is an end view of the device of Figure 8.

Figure 10 is a side elevational view of a rotor having slip rings.

As shown in the drawings:

The reference numeral 10 indicates generally an electric motor armature having a core 11, which is usually of the laminated type, fixed to a shaft 12 and having a plurality of coils 13 wound around slots in the core 11. Each of the coils 13 has a lead wire 14 which extends from the core 11 to a commutator 15. The commutator is provided with a core 16 of an insulating material such as synthetic mica or the like. The core 16 has an annular sleeve-like portion 17 with radially extending spaced separators 18. The separators are integral with the sleeve 17 and are thicker at their tops as shown at 19. Their root or base portions are relatively narrow as shown at 20. Between each radially extending separator 18 is a space 21 within which a commutator contact is positioned. Ordinarily these spaces would be filled with a preformed copper segment which would then be soldered to each one of the lead wires 14 from the armature coils 13. However, in the present invention the commutator contacts are not preformed but are built or formed in the space provided for the finished contact between the insulating separators 18. As previously stated, the upper portion 19 of the insulator 18 is considerably thicker than the lower portion 20, and hence the spaces 21 between the insulators 18 are just the opposite so that the upper portion of the space is relatively narrower than the wide base portion. Within the wedge-shaped spaces 21 between the separators 18 wire gripping members are formed integrally with the commutator core 16. These wire gripping members are formed of two inwardly extending elements 22 and 23, as shown in Figures 2 and 3, which form part of the separators 18. They curve inwardly and downwardly toward each other in the form of a wide arcuate mouth which becomes more and more restricted as they proceed downwardly. Where the elements 22 and 23 join the core 16 the space between the two is slightly less than the diameter of the wire to be used in the winding of the armature coils. This insures a positive temporary grip on the wire as it is drawn down between the elements 22 and 23.

In constructing the motor the armature core 11 is wound with wire coils 13 and a lead wire 14 from each of these coils is forced down and wedged between the wire gripping members 22 and 23 within the commutator core 16 between the insulating separators 18. As shown in Figure 3 shields 24 and 25 are placed adjacent the sides of the armature core 16. After the lead wire 14 is wedged in position a metallizing gun 26, as shown in Figure 4, deposits metal within the space 21 defined by the separators 18 and the shields 24 and 25.

Metallizing is the depositing of finely divided fused particles of metal. The metallizing is accomplished by means of the gun 26 which is adapted to fuse the metal employed for depositing as well as to project it under considerable pressures against a surface to be metallized. The fused metal particles projected at relatively high rates of speed become slightly impregnated in and adhere to most surfaces and in addition the particles adhere to each other. In the present instance the insulating core 16, which has been stated to be preferably a synthetic mica, will readily become impregnated with metal deposited by the metallizing process just described, and subsequent deposits will build rather readily onto the original deposits, filling the wedge-shaped spaces 21 between the insulating separators 18. The fact that the metal being deposited is fused or molten causes it to positively adhere to the lead wire wedged between the gripping members 22 and 23. Hence the forming of the commutator segment performs the functions of electrically and physically connecting the lead wire to the segment and locking the segment in position between the insulating separators 18 by reason of the narrow space between the tops and the wide space between the lower ends of the insulators 18. The only step remaining in the method of constructing the commutator is to take a circular cut off the surface of the commutator which has the metal from the metallizing build-up process extending above the surface of the insulating fingers or separators 18, as shown at 27 in Figure 4 and as shown removed in Figure 5. The metallizing of deposits of copper into the spaces 21 is a relatively quick process and takes substantially no longer time for each segment than is ordinarily consumed in the soldering of lead wires to the commutator segments in the ordinary commutator. Hence the commutator of this invention is economical to manufacture as it eliminates several steps in the manufacture thereof and produces a commutator fully as efficient as those made heretofore.

Figures 6 and 7 show a modification of the commutator incorporating the metallizing principles of this invention. An insulating core in the form of a cylinder 28 forms a base support for the commutator. In constructing this commutator the full annular surface of the cylinder 28 is metallized at 29 in such a manner that deposits of metal cover the entire periphery at substantially uniform thickness. Subsequent to the metallizing of the full surface of the cylinder 28, radial slots 30 are made longitudinally of the cylinder and project radially inwardly toward the center thereof at regular intervals around the periphery of the cylinder. The slots 30 project through the metallized surface 29 and into at least a portion of the body of the insulating cylinder 28 as shown at 31. Lead wires 32 are attached to the segments of the resultant commutator defined by the radial slots 30. These lead wires may be preliminarily fastened to the surface of the cylinder 28 prior to the metallizing step, in which event they will automatically be fixed to the individual segments of the commutator upon completion thereof, or they need not be attached in this manner but may be soldered to the individual segments after completion of the commutator. There is no other insulating spacer between the segments of this commutator excepting the air space formed by the slots 30. This feature contributes to the economical manufacturing of a low-priced electrical motor.

Another use of metallized commutators is the application to time interval switches which are commonly used in conjunction with traffic signals. A rotatable cylinder shown at 33 in Figure 7 is made of an insulating material. In the present construction of time interval switches of this type, partial bands of metal are applied around a core and spaced electrical contact members comparable to brushes running on a commutator complete the circuit for a light-bulb or any other electrical device through the partial band. However, as the cylinder rotates the contact members will pass over the portion of the cylinder which the incomplete band does not cover. At this point, of course, the circuit is broken and the electrical device is no longer in operation. Continued rotation of the cylinder, however, causes a resumption of electrical circuit completion, and the particular spacing provided by the incomplete band will cause a regular interval at which the circuit will be complete and then incomplete. It has been quite difficult to cause incomplete bands of metal to adhere to the surface of a cylinder. Each cylinder is generally equipped with a plurality of spaced incomplete rings to operate a number of circuits. It is therefore imperative that the rings remain in fixed position both in regard to rotational movement as well as axial movement in order to maintain the correct fixed time intervals for each circuit. In order to obviate the difficulty in attaching commutator or contact rings to an insulating cylindrical core such as 33, the ring or band is applied by metallizing the surface of the cylinder. As best shown in Figure 8 metal is deposited by the metallizing process over the portion 34 on the outside of the cylindrical core 33. A space is left between the ends 35 and 36 of this metallized band, and in order that the electrical circuit contact members 37 and 38 will not become jammed upon rotation of the cylinder a filler 39 of insulating material is applied between the ends of the band to complete the full concentric track over the cylindrical core 33. In the position of the cylinder as shown in Figure 8, an electrical circuit 40 having an incandescent lamp 41 or any other electrical device to be operated is completed by passage of electrical current through the metallized band 34. A source of electrical power 42 in the circuit 40 causes the lamp 41 to be illuminated. Upon continued rotation of the cylinder 33 about its axial shaft 43 each of the contact points 37 and 38 will in turn ride over the insulated portion 39 of this band causing the circuit to be broken. Therefore upon each complete revolution of the cylinder 33 the lamp 41 will be extinguished on two occasions. Of course, if it is desired to have the lamp 41 turned on and off at more numerous intervals other insulated spaces may be provided in the metal 34. The adjacent metallized rings 34 as shown in Figure 7 each control a separate electrical circuit, and the contact members 37 and 38 are duplicated for each metallized partial ring. The size of the insulated space 39 in these numerous rings may be varied in order to accomplish the desired results for the particular circuit with which it is used.

Another application of the metallizing of commutator elements is with a slip ring type motor or generator wherein it is desired to continuously carry an electrical current to or from a rotor. The commutator consists of axially spaced rings 44 and 45. The rings according to this invention are in the form of metallized bands over an insulating core 46. Electrical brushes or contact members 47 and 48 are adapted to ride on the surface of the metallized bands 44 and 45, respectively, and to carry electrical current to or from the armature through lead wires 49 and 50. The lead wires may be fastened to the rings by applying the deposits of metal over them, or they may be subsequently soldered as desired.

It is apparent from the number of uses shown in the drawings and described in the specification that any electrical contacting device, such as commutators for motors, generators or switches and the like may be feasibly made by the metallizing process. It has been shown that the contact members may be full annular rings or may be merely small segments or bands. An important reason for the success of this process is the positive adherence of the finely divided particles of metal in a fused state to an insulating core. Further, any desired thickness of the contact member may be made merely by continuing the depositing of metal by the metallizing process.

Numerous details of construction may be varied throughout a wide range without departing from the principles disclosed herein, and I therefore do not propose limiting the patent granted hereon otherwise than as defined in the appended claims.

What is claimed is:

1. A commutator for association with armatures of electric devices comprising an annular core of insulating material having radially extending spaced separators, means extending inwardly from adjacent separators providing a narrow passage of a width slightly less than the diameter of the wire used in the armatures for temporarily holding lead wires coming from the armature winding, and deposits of fused metal particles filling the space defined by the separators and electrically and physically joining the temporarily held lead wires to the metal segment formed by the metal deposits.

2. A commutator for association with armatures of electric devices comprising an annular core of insulating material having radially extending spaced separators, means between the separators for temporarily holding lead wires coming from the armature winding, and deposits of fused metal particles filling the space defined by the separators and electrically and physically joining the lead wires to the metal segment formed by the metal deposits, said means including projections from each of the adjacent separators and extending inwardly toward each other leaving a space therebetween less than the diameter of the wire used in the armature whereby the lead wires may be wedged between these projections.

3. A commutator for association with armatures of electric devices comprising an annular core of insulating material having radially extending spaced separators, said radially extending spaced separators being relatively thicker at their outer edges than at their attachment to the annular core and thus defining a space therebetween which has a narrow top and a wide bottom, means between the separators for temporarily holding lead wires coming from the armature winding, and deposits of fused metal particles filling the space defined by the separators, electrically and physically joining the lead wires to the metal segment formed by the metal deposits, and wedging the metal segment formed in the space of narrow top and wide bottom, said means including arcuate projections from each of the adjacent separators and extending inwardly toward each other with a wide mouth at the top and becoming restricted as it proceeds downwardly, whereby the lead wires of the armature may be easily inserted through the wide mouth and forced down and held in the restricted lower portion.

4. A commutator for association with armatures of electric devices comprising an annular core of insulating material having radially extending spaced separators, projecting means extending inwardly from at least one of adjacent separators to form a restricted passage between adjacent separators of a width less than the diameter of the wire used in the armatures and adapted to temporarily grip an armature lead wire, and deposits of fused metal particles filling the spaces defined by the separators and electrically and physically joining the temporarily held lead wires to the metal segments formed by the metal deposits.

JOHN C. KOONZ.

REFERENCES CITED

The following references are of record in the file of this patent:

UNITED STATES PATENTS

| Number | Name | Date |
| --- | --- | --- |
| 1,994,062 | Bonanno | Mar. 12, 1935 |
| 2,316,652 | Moeller | Apr. 13, 1943 |
| 2,400,590 | Meyerhoefer | May 21, 1946 |

FOREIGN PATENTS

| Number | Country | Date |
| --- | --- | --- |
| 285,661 | Great Britain | Feb. 23, 1928 |